(12) United States Patent
Tober et al.

(10) Patent No.: US 8,799,513 B2
(45) Date of Patent: Aug. 5, 2014

(54) MANAGING RESOURCES FOR IP NETWORKING

(75) Inventors: Benjamin A. Tober, Northborough, MA (US); Matthew H. Harper, Salem, NH (US); Leonard Schwartz, North Andover, MA (US)

(73) Assignee: Cisco Technology, Inc., San Jose, CA (US)

( * ) Notice: Subject to any disclaimer, the term of this patent is extended or adjusted under 35 U.S.C. 154(b) by 635 days.

(21) Appl. No.: 12/507,648

(22) Filed: Jul. 22, 2009

(65) Prior Publication Data

US 2010/0023576 A1 Jan. 28, 2010

Related U.S. Application Data

(62) Division of application No. 10/679,938, filed on Oct. 6, 2003, now Pat. No. 7,613,836.

(60) Provisional application No. 60/416,151, filed on Oct. 4, 2002.

(51) Int. Cl.
*G06F 15/16* (2006.01)
*H04L 12/28* (2006.01)
*H04L 12/56* (2006.01)
*H04L 12/46* (2006.01)

(52) U.S. Cl.
CPC .......... *H04L 45/586* (2013.01); *H04L 12/4662* (2013.01); *H04L 12/4641* (2013.01)
USPC ............................. 709/245; 370/392; 370/401

(58) Field of Classification Search
CPC .... H04L 45/586; H04L 45/00; H04L 12/4641
USPC ................. 709/227–229, 243, 238, 239, 250; 370/389, 392, 397, 399
See application file for complete search history.

(56) References Cited

U.S. PATENT DOCUMENTS

| 5,488,716 | A | 1/1996 | Schneider et al. | |
| 6,119,170 | A * | 9/2000 | Schoffelman et al. | 709/244 |
| 6,205,488 | B1 | 3/2001 | Casey et al. | |
| 6,330,599 | B1 | 12/2001 | Harvey | |
| 6,560,217 | B1 | 5/2003 | Peirce, Jr. et al. | |
| 6,765,900 | B2 | 7/2004 | Peirce, Jr. et al. | |
| 6,912,590 | B1 * | 6/2005 | Lundback et al. | 709/238 |
| 2002/0099849 | A1 | 7/2002 | Alfieri et al. | |
| 2002/0129166 | A1 | 9/2002 | Baxter et al. | |

(Continued)

FOREIGN PATENT DOCUMENTS

EP 1271861 A2 1/2003

OTHER PUBLICATIONS

Supplementary European Search Report issued for corresponding European Patent Application No. 03808160.0 mailed Oct. 26, 2009.

(Continued)

*Primary Examiner* — Hieu Hoang
(74) *Attorney, Agent, or Firm* — Wilmer Cutler Pickering Hale and Dorr LLP

(57) ABSTRACT

Resources for IP networking are managed. A field is added to an operating system kernel software procedure. The field references a virtual router context. Packet processing software code is modified to cause the packet processing software code to execute in accordance with the virtual router context.

13 Claims, 7 Drawing Sheets

(56) References Cited

U.S. PATENT DOCUMENTS

| | | | |
|---|---|---|---|
| 2002/0138628 A1 | 9/2002 | Tingley et al. | |
| 2003/0051048 A1* | 3/2003 | Watson et al. | 709/238 |
| 2003/0172109 A1* | 9/2003 | Dalton et al. | 709/203 |

OTHER PUBLICATIONS

Fourth Amended Complaint, *UTSTARCOM, Inc.*, vs. *Starent Networks, Corp., et al.*, in the United States District Court for the Northern District of Illinois Eastern Division, Case 1:07-cv-02582, Document 207, Filed Sep. 25, 2008, pp. 1, 46, 47, 68, 69 and 91.

Blair, G. et al., *Object-Oriented Languages, Systems and Applications*, Pitman Publishing, London (1991) 24 pgs.

Bosse, *Signaling in Telecommunication Networks*, John Wiley & Sons, Inc., New York (1998) 2 pgs.

Bressoud & Schneider, "Hypervisor-Based Fault-Tolerance," ACM Transactions on Computer Systems, TOCS, vol. 14, No. 1, pp. 80-107 (Feb. 1996).

Bugnion, et al., "Disco: Running Commodity Operating Systems on Scalable Multiprocessors," ACM Transactions on Computer systems, TOCS, vol. 15, No. 4 (1997) 14 pgs.

Cusack & Cordingly, "Object orientation in communications engineering," BT Technology Journal, vol. 11, No. 3 (Jul. 1993) 10 pgs.

Ebcioglu & Altman, "DAISY: Dynamic Compilation for 100% Architectural Compatibility," Proceedings of the 24th International Symposium on Computer Architecture (1997) 12 pgs.

Goldberg, R.P., "Survey of Virtual Machine Research," IEEE Computer, vol. 7, No. 6 (1974) 13 pgs.

Low & Schneider, *CDMA Internetworking: Deploying the Open A-Interface*, Prentice Hall PTR, New Jersey (2000) 2 pgs.

Martin, P.A., "Twenty twenty vision—software architectures for intelligence into the 21st century," BT Technology Journal, vol. 8, No. 3, pp. 120-131 (Jul. 1990).

Rosenblum, et al., "Using the SimOS Machine Simulator to Study Complex Computer Systems," ACM Transactions on Modeling and Computer Simulation, vol. 7, No. 1, pp. 78-103 (Jan. 1997).

* cited by examiner

MANAGING RESOURCES FOR IP NETWORKING

CROSS-REFERENCE TO RELATED APPLICATIONS

This application is a divisional of application Ser. No. 10/679,938, filed Oct. 6, 2003, pending; which claims priority under 35 USC Section 119(e) to U.S. Provisional Application Ser. No. 60/416,151 entitled LINUX KERNEL CHANGES FOR VIRTUAL ROUTERS AND DISTRIBUTED HOST FUNCTIONS on Oct. 4, 2002, each of which is incorporated herein in its entirety.

BACKGROUND

This invention relates to managing resources for IP networking.

An operating system such as Linux plays an important role in a computer, including facilitating application software's use of hardware and other resources of the computer. In some cases, the operating system or related software may allow resources of the computer to be shared or combined in being brought to bear on computing tasks.

For example, various systems have been proposed to allow sharing of computer resources. These include virtual machine monitors, machine simulators, application emulators, operating system emulators, embedded operating systems, legacy virtual machine monitors, and boot managers. Each of these systems is described briefly below.

Virtual Machine Monitors

One system that was the subject of intense research in the late 1960's and 1970's came to be known as the "virtual machine monitor" (VMM). See, for example, R. P. Goldberg, "Survey of virtual machine research," IEEE Computer, Vol. 7, No. 6, 1974. During that time, moreover, IBM Corp. adopted a virtual machine monitor for use in its VM/370 system.

A virtual machine monitor is a thin piece of software that runs directly on top of the hardware and virtualizes all the resources of the machine. Since the exported interface is the same as the hardware interface of the machine, the operating system cannot determine the presence of the VMM. Consequently, when the hardware interface is compatible with the underlying hardware, the same operating system can run either on top of the virtual machine monitor or on top of the raw hardware.

Virtual machine monitors were popular at a time where hardware was scarce and operating systems were primitive. By virtualizing all the resources of the system, multiple independent operating systems could coexist on the same machine. For example, each user could have her own virtual machine running a single-user operating system.

The research in virtual machine monitors also led to the design of processor architectures that were particularly suitable for virtualization. It allowed virtual machine monitors to use a technique known as "direct execution," which simplifies the implementation of the monitor and improves performance. With direct execution, the VMM sets up the processor in a mode with reduced privileges so that the operating system cannot directly execute its privileged instructions. The execution with reduced privileges generates traps, for example when the operating system attempts to issue a privileged instruction. The VMM thus needs only to correctly emulate the traps to allow the correct execution of the operating system in the virtual machine.

As hardware became cheaper and operating systems more sophisticated, VMMs based on direct execution began to lose their appeal. Recently, however, they have been proposed to solve specific problems. For example, the Hypervisor system provides fault-tolerance, as is described by T. C. Bressoud and F. B. Schneider, in "Hypervisor-based fault tolerance," ACM Transactions on Computer Systems (TOCS), Vol. 14. (1), February 1996; and in U.S. Pat. No. 5,488,716 "Fault tolerant computer system with shadow virtual processor," (Schneider, et al.). As another example, the Disco system runs commodity operating systems on scalable multiprocessors. See "Disco: Running Commodity Operating Systems on Scalable Multiprocessors," E. Bugnion, S. Devine, K. Govil and M. Rosenblum, ACM Transactions on Computer Systems (TOCS), Vol. 15, No. 4, November 1997, pp. 412-447.

Virtual machine monitors can also provide architectural compatibility between different processor architectures by using a technique known as either "binary emulation" or "binary translation." In these systems, the VMM cannot use direct execution since the virtual and underlying architectures mismatch; rather, they must emulate the virtual architecture on top of the underlying one. This allows entire virtual machines (operating systems and applications) written for a particular processor architecture to run on top of one another. For example, the IBM DAISY system has recently been proposed to run PowerPC and x86 systems on top of a VLIW architecture. See, for example, K. Ebcioglu and E. R. Altman, "DAISY: Compilation for 100% Architectural Compatibility," Proceedings of the 24th International Symposium on Computer Architecture, 1997.

Machine Simulators/Emulators

Machine simulators, also known as machine-emulators, run as application programs on top of an existing operating system. They emulate all the components of a given computer system with enough accuracy to run an operating system and its applications. Machine simulators are often used in research to study the performance of multiprocessors. See, for example, M. Rosenblum, et al., "Using the SimOS machine simulator to study complex computer systems," ACM Transactions on Modeling and Computer Simulation, Vol. 7, No. 1, January 1997. They have also been used to simulate an Intel x86 machine as the "VirtualPC" or "RealPC" products on a PowerPC-based Apple Macintosh system.

Machine simulators share binary emulation techniques with some VMMs such as DAISY. They differentiate themselves from VMMs, however, in that they run on top of a host operating system. This has a number of advantages as they can use the services provided by the operating system. On the other hand, these systems can also be somewhat constrained by the host operating system. For example, an operating system that provides protection never allows application programs to issue privileged instructions or to change its address space directly. These constraints typically lead to significant overheads, especially when running on top of operating systems that are protected from applications.

Application Emulators

Like machine simulators, application emulators also run as an application program in order to provide compatibility across different processor architectures. Unlike machine simulators, however, they emulate application-level software and convert the application's system calls into direct calls into the host operating system. These systems have been used in research for architectural studies, as well as to run legacy binaries written for the 68000 architecture on newer PowerPC-based Macintosh systems. They have also been also been used to run x86 applications written for Microsoft NT on Alpha workstations running Microsoft NT. In all cases, the expected operating system matches the underlying one, which simplifies the implementation. Other systems such as the known Insigna's SoftWindows use binary emulation to run Windows applications and a modified version of the Windows operating system on platforms other than PCs. At least two known systems allow Macintosh applications to run on other systems: the Executer runs them on Intel processors running Linux or Next and MAE runs them on top of the Unix operating system.

Operating System Emulators

Operating system (OS) emulators allow applications written for one given operating system application binary interface (ABI) to run on another operating system. They translate all system calls made by the application for the original operating system into a sequence, of system calls to the underlying operating system. ABI emulators are currently used to allow Unix applications to run on Window NT (the Softway OpenNT emulator) and to run applications written for Microsoft's operating systems on public-domain operating systems (the Linux WINE project).

Unlike virtual machine monitors and machine simulators, which are essentially independent of the operating system, ABI emulators are intimately tied with the operating system that they are emulating. Operating system emulators differ from application emulators in that the applications are already compiled for the instruction set architecture of the target processor. The OS emulator does not need to worry about the execution of the applications, but rather only of the calls that it makes to the underlying operating system.

Embedded Operating Systems

Emulating an ABI at the user level is not an option if the goal is to provide additional guarantees to the applications that are not provided by the host operating system. For example, the VenturCom RTX Real-Time subsystem embeds a real-time kernel within the Microsoft NT operating system. This effectively allows real-time processes to co-exist with traditional NT processes within the same system.

This co-existence requires the modification of the lowest levels of the operating system, that is, its Hardware Abstraction Layer (HAL). This allows the RTX system to first handle all I/O interrupts. This solution is tightly coupled with WindowsNT, since both environments share the same address space and interrupts entry points.

Legacy Virtual Machine Monitors

Certain processors, most notably those with the Intel architecture, contain special execution modes that are specifically designed to virtualize a given legacy architecture. This mode is designed to support the strict virtualization of the legacy architecture, but not of the existing architecture.

A legacy virtual machine monitor consists of the appropriate software support that allows running the legacy operating system using the special mode of the processor. Specifically, Microsoft's DOS virtual machine runs DOS in a virtual machine on top of Microsoft Windows and NT. As another example, the freeware DOSEMU system runs DOS on top of Linux.

Although these systems are commonly referred to as a form of virtual machine monitor, they run either on top of an existing operating system, such as DOSEMU, or as part of an existing operating system such as Microsoft Windows and Microsoft NT. In this respect, they are quite different from the true virtual machine monitors described above, and from the definition of the term "virtual machine monitor" applied to the invention described below.

With respect to combining resources, such combinations can be used to handle demanding computing tasks that may be difficult or impossible to handle in the absence of the combination. For example, telecommunications networks are increasingly required to support high bandwidth, low delay information flow. The bandwidth required is rapidly progressing towards, for some applications, gigabits per second (particularly, for example, for video on demand; animated shared simulations, and distributed computing).

To provide "intelligent network" facilitates such as call redirection to particular numbers, computer programs run on a number of host computers (up to 100, for example) connected with switching centers. The way in which services are to be provided for particular customers (for example, a particular number to which calls for a customer are to be routed) depends upon data stored in relation to that customer on the host computers. Thus, there may be many millions of subscriber records on tens or hundreds of host computers.

In "Twenty-twenty vision—software architectures for intelligence in the 21st century", P. A. Martin, BT Technol J Vol 13 No. 2 April 1995, the author proposed the use of object-oriented techniques to implement the distributed processing required.

A description of object oriented technology will be found in, for example, BT Technol J Vol. 11 No. 3 (July 1993), "Object oriented technology", edited by E. L. Cusack and E. S. Cordingley. Although the term is not always used with precision, object oriented computing here refers to the computing technique in which data is stored in "encapsulated" form in which, rather than being directly accessible by a calling program or routine, the data is accessible only by a limited part of a program which can read, write and edit the data. A record of data and its associated computer code are referred to as an "object". Communication to and from an object is generally by "message passing"; that is, a call to the object passes data values and invokes the operation of one of the programs comprised within the object, which then returns data values.

Various languages are available for programmers who wish to use the objected oriented approach. Of these, the commonest at present is C++.

Distributed processing differs from single processor operation in several respects. Firstly, different access techniques may be required depending on whether other programs or data are located on the same host computer as a calling program or on a different host computer. The location of a program or data will also affect the speed with which it can be reached from another program. Also, one or more host computers may fail whilst leaving others in operation.

Distributed computing is conventionally performed, by using a "client-server" arrangement in which a "client" program on one computer interrogates a "server" program on another computer which then performs the function or returns the data required by the client program.

Object oriented techniques have not widely been applied to distributed processing. A summary of the state of the art in this respect may be found in "Object oriented programming systems"; Blair G., Pitman Publishing, London, 1991 (ISBN 0-273-03132-5) and particularly in Chapter 9 at pages 223-243; "Distributed systems and objects"; David Hutchison and Jonathan Walpole. Previous attempts have generally added new syntax to an existing computer language, or have created new computer languages, to extend conventional object oriented programming to deal with distributed processing.

Although the particular application may vary, the components of a wireless communication system are generally similar, as described in more detail below. For example, a wireless communication system usually includes a radio terminal or mobile station, a radio base station, a switch or network control device, often referred to as a mobile telephone switching office (MTSO), and a network to which the wireless communications system provides access, such as the Public Switched Telephone Network (PSTN).

The various wireless communication applications use any of multiple modulation techniques for transmitting information to efficiently utilize the available frequency spectrum. For example, frequency division multiple access (FDMA), time division multiple access (TDMA), and code division multiple access modulation techniques are used to build high-capacity multiple access systems. Telecommunication systems designed to communicate with many mobile stations occupying a common radio spectrum are referred to as multiple access systems.

For example, in an FDMA analog cellular system, such as an AMPS analog cellular radio system, the available frequency spectrum is divided into a large number of radio channels, e.g., pairs of transmit and receive carrier frequencies, each of which corresponds to a message transmission channel. The bandwidth of each transmit and receive frequency channel is narrowband, generally 25-30 kHz. Thus, the FDMA system permits information to be transmitted in a bandwidth comparable to the bandwidth of the transmitted information, such as a voice signal. The cellular service area in the FDMA system is generally divided into multiple cells, each cell having a set of frequency channels selected so as to help reduce co-channel interference between cells.

Frequency division is often combined with time division so that transmission circuits are distinguished in both the frequency and time domain, e.g., in a FD/TDMA system. In a digital FD/TDMA (commonly referred to as TDMA) cellular system, a narrowband frequency channel is reformatted as a digital transmission path which is divided into a number of time slots. The data signals from different calls are interleaved into assigned time slots and sent out with a correspondingly higher bit rate, the time slot assigned to each mobile station being periodically repeated. Although the TDMA bandwidth may be somewhat larger than the FDMA bandwidth, a bandwidth of approximately 30 kHz is generally used for AMPS-D digital TDMA cellular systems.

Another approach to cellular multiple access modulation is CDMA. CDMA is a spread spectrum technique for transmitting information over a wireless communication system in which the bandwidth occupied by the transmitted signal is significantly greater than the bandwidth required by the baseband information signal (e.g., the voice signal). Thus, CDMA modulation spectrally spreads a narrowband information signal over a broad bandwidth by multiplex modulation, using a codeword to identify various signals sharing the same frequency channel. Recognition of the transmitted signal takes place by selecting the spectrally-coded signals using the appropriate codeword. In contrast to the narrowband channels of approximately 30 kHz used in FDMA and TDMA modulation techniques, a CDMA system generally employs a bandwidth of approximately 1.25 MHz or greater.

Typically, the mobile communication systems described above are arranged hierarchically such that a geographical "coverage area" is partitioned into a number of smaller geographical areas called "cells." Referring to FIG. 1, each cell is preferably served by a Base Transceiver Station ("BTS") 102a. Several BTS 102a-n are centrally administered via fixed links 104a-n by a Base Station Controller ("BSC") 106a. The BTSs and BSC are sometimes collectively referred to as the Base Station Subsystem ("BS") 107. Several BSCs 106b-n may be centrally administered by a Mobile Switching Center ("MSC") 110 via fixed links 108a-n.

MSC 110 acts as a local switching exchange (with additional features to handle mobility management requirements, discussed below) and communicates with the phone network ("PSTN") 120 through trunk groups. U.S. mobile networks include a home MSC and a serving MSC. The home MSC is the MSC corresponding to the exchange associated with a Mobile Subscriber (also referred to above as a mobile station or "MS") 114; this association is based on the phone number, such as the area code, of the MS. Examples of an MS include a hand-held device such as a mobile phone, a PDA, a 2-way pager, or a laptop computer, or Mobile Unit Equipment, such as a mobile unit attached to a refrigerator van or a rail car, a container, or a trailer.

The home MSC is responsible for a Home Location Register ("HLR") 118 discussed below. The serving MSC, on the other hand, is the exchange used to connect the MS call to the PSTN. Consequently, sometimes the home MSC and serving MSC functions are served by the same entity, but other times they are not (such as when the MS is roaming). Typically, a Visiting Location Register ("VLR") 116 is co-located with the MSC 110 and a logically singular HLR is used in the mobile network (a logically singular HLR may be physically distributed but is treated as a single entity). As will be explained below, the HLR and VLR are used for storing subscriber information and profiles.

Radio channels 112 are associated with the entire coverage area. As described above, the radio channels are partitioned into groups of channels allocated to individual cells. The channels are used to carry signaling information to establish call connections and related arrangements, and to carry voice or data information once a call connection is established.

Mobile network signaling has at least two significant aspects. One aspect involves the signaling between an MS and the rest of the network. In the case of 2G ("2G" is the industry term used for "second generation") and later technology, this signaling concerns access methods used by the MS (such as TDMA or CDMA), pertaining to, for example, assignment of radio channels and authentication. A second aspect involves the signaling among the various entities in the mobile network, such as the signaling among the MSCs, BSCs, VLRs, and HLRs. This second part is sometimes referred to as the Mobile Application Part ("MAP") especially when used in the context of Signaling System No. 7 ("SS7"). SS7 is a common channel signaling system by which elements of the telephone network exchange information, in the form of messages.

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (described below) to determine whether the MS 114 is allowed the requested service. The serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to an MS 114, (assuming that the call originates from the PSTN 120) the PSTN user dials the MS's associated phone number. At least according to U.S. standards, the PSTN 120 routes the call to the MS's home MSC (which may or may not be the MSC serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are set up.

During a call, the BS 107 and MS 114 may cooperate to change channels or BTSs 102, if needed, for example, because of signal conditions. These changes are known as "handoffs," and they involve their own types of known messages and signaling.

FIG. 2 shows in more detail the signaling and user traffic interfaces between a BS 107 and an MSC 110 in a CDMA mobile network. The BS 107 communicates signaling information using an SS7-based interface for controlling voice and data circuits known as the "A1" interface. An interface known as "A2" carries user traffic (such as voice signals) between the switch component 204 of the MSC and the BS 107. An interface known as "A5" is used to provide a path for user traffic for circuit-switched data calls (as opposed to voice calls) between the source BS and the MSC. Information about one or more of A1, A2, A5 may be found in CDMA Internetworking—Deploying the Open-A Interface, Su-Lin Low, Ron Schneider, Prentice Hall, 2000, ISBN 0-13-088922-9.

Mobile communications providers are supplying newer services, e.g., "data calls" to the Internet. For at least some of these services, MSCs are not cost effective because they were primarily designed for voice calls. Integration of new services into the MSC is difficult or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Integrating new services via MSC design changes or through trunk-side adjuncts can increase network congestion at the MSC and consume costly MSC resources.

Data calls typically make use of the Internet, which is an example of a packet-switching medium. A packet-switching medium operates as follows. A sequence of data is to be sent from one host to another over a network. The data sequence is segmented into one or more packets, each with a header containing control information, and each packet is routed through the network. A common type of packet switching is datagram service, which offers little or no guarantees with respect to delivery. Packets that may belong together logically at a higher level are not associated with each other at the network level. A packet may arrive at the receiver before another packet sent earlier by the sender, may arrive in a damaged state (in which case it may be discarded), may be delayed arbitrarily (notwithstanding an expiration mechanism that may cause it to be discarded), may be duplicated, and may be lost.

At least one wireless Internet system has been proposed that provides reliable access to tens of megahertz of bandwidth across a wide geographic area, using local wireless transceiver technology (e.g., in a nanocell system). In contrast to the cellular wireless voice system, which relies on tens or hundreds of cells in a region, the local wireless transceiver system relies on thousands or tens of thousands of transceivers in the region. In such a system, each transceiver may cover, e.g., 0.05 square kilometers, which is about one-hundredth the coverage of a conventional cell. High spatial reuse of the radio frequency (RF) spectrum allows the local wireless transceiver system to accommodate many more active devices at a given data rate than a conventional cell system. In addition, since users are closer to access points, the local wireless transceiver system accommodates lower-power transmissions. The local wireless transceiver system can support large numbers of devices, running at high speeds, with relatively little drain on the devices' batteries.

For example, in a citywide local wireless transceiver system network of 10,000 transceiver access points (cell centers), if each point provides its users with 1-Mb/s collective throughput, 10 active devices per transceiver can be supported at 100 kb/s each, which amounts to 100,000 active devices in the city. If each device is active 10 percent of the time, such a network can support a million devices, although some accounting would need to be made for bandwidth consumed by overhead for channel access, handoffs, and any provision for asymmetric traffic (e.g., in which more bits flow toward a device than from it).

Each local wireless transceiver system access point may be or resemble access points for wireless local area network (LAN) technology such as IEEE 802.11. An asynchronous digital subscriber line (ADSL), or a cable modem line may be used to provide a link between each access point and the Internet (a wireless link may be used as well or instead). With respect to the siting of access devices, since each device requires electrical power and is preferably elevated for adequate radio frequency coverage, sites on utility poles and buildings are typical candidates, with the high-speed neighborhood Internet access infrastructure serving as a backbone.

SUMMARY

In an aspect of the invention, resources for IP networking are managed. A field is added to an operating system kernel software procedure. The field references a virtual router context. Packet processing software code is modified to cause the packet processing software code to execute in accordance with the virtual router context.

Implementations of the invention may provide one or more of the following advantages. Multiple hosts may be implemented on the same processor or the same instance of the operating system. The same IP address may be used in two different contexts such that the IP address serves as two different entities. One piece of equipment may participate in multiple private networks without leaking information between the private networks. A host implementation for one Internet Protocol (IP) address may be spread across multiple, loosely coupled processors running separate instances of an operating system. Combined processing power may be used for one IP host. A distributed host may be compatible with an existing configuration or existing protocols that require actions to be done on one host. The distributed host may be used with an existing configuration such that a customer need not change the general design of the customer's implementation.

Other advantages and features will become apparent from the following description, including the drawings, and from the claims.

DETAILED DESCRIPTION

Figure 1:
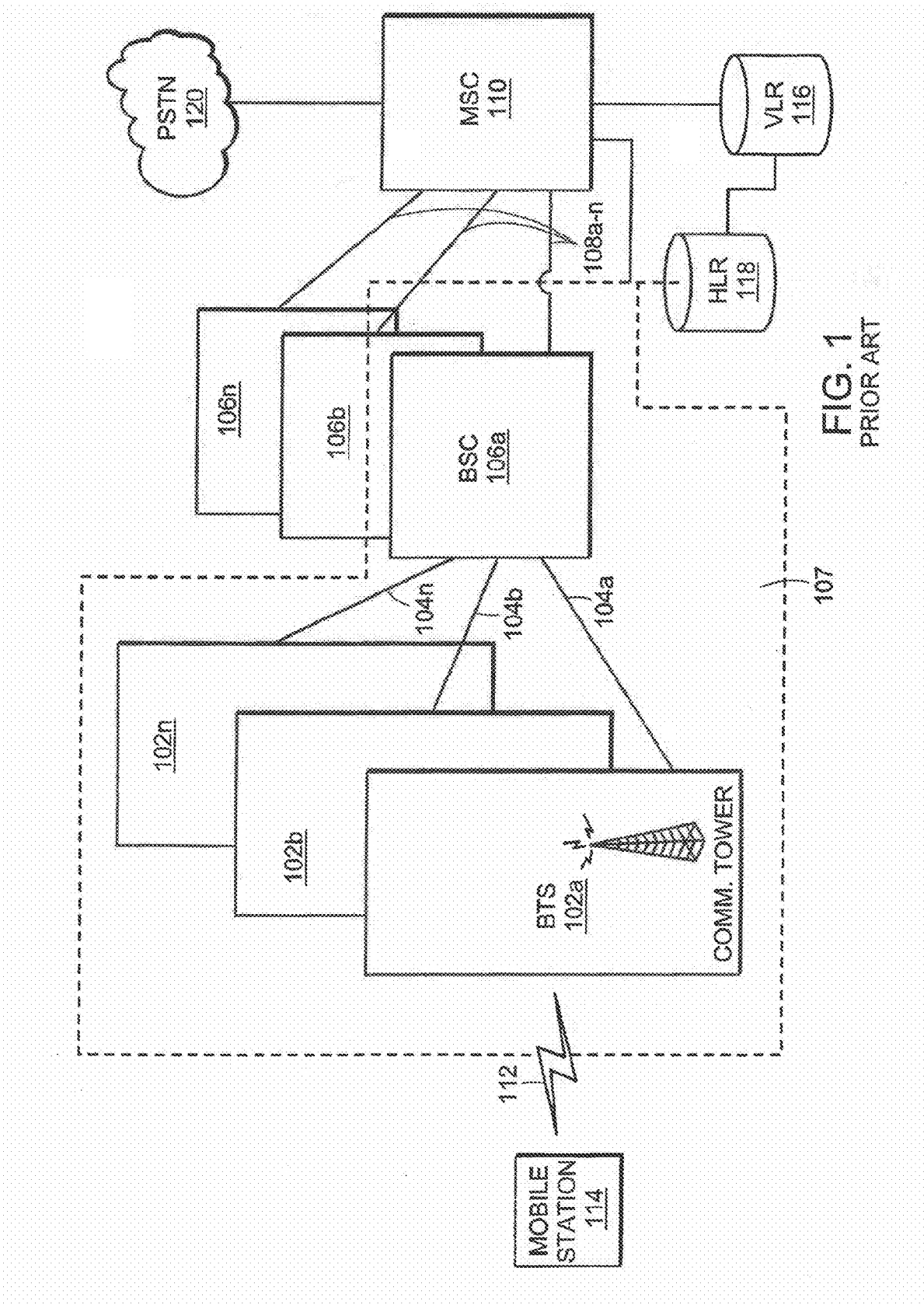
FIGS. 1-2, 3A-3B, 4 are block diagrams of communications systems.
Figure 2:
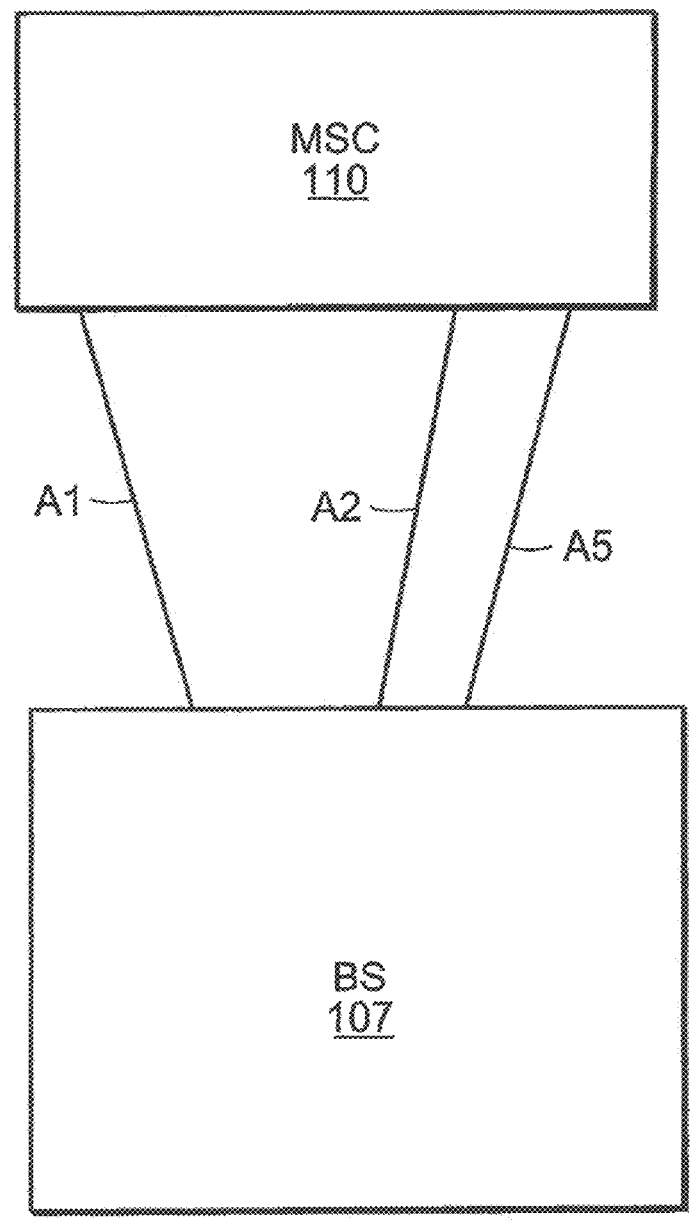
Figure 3A:
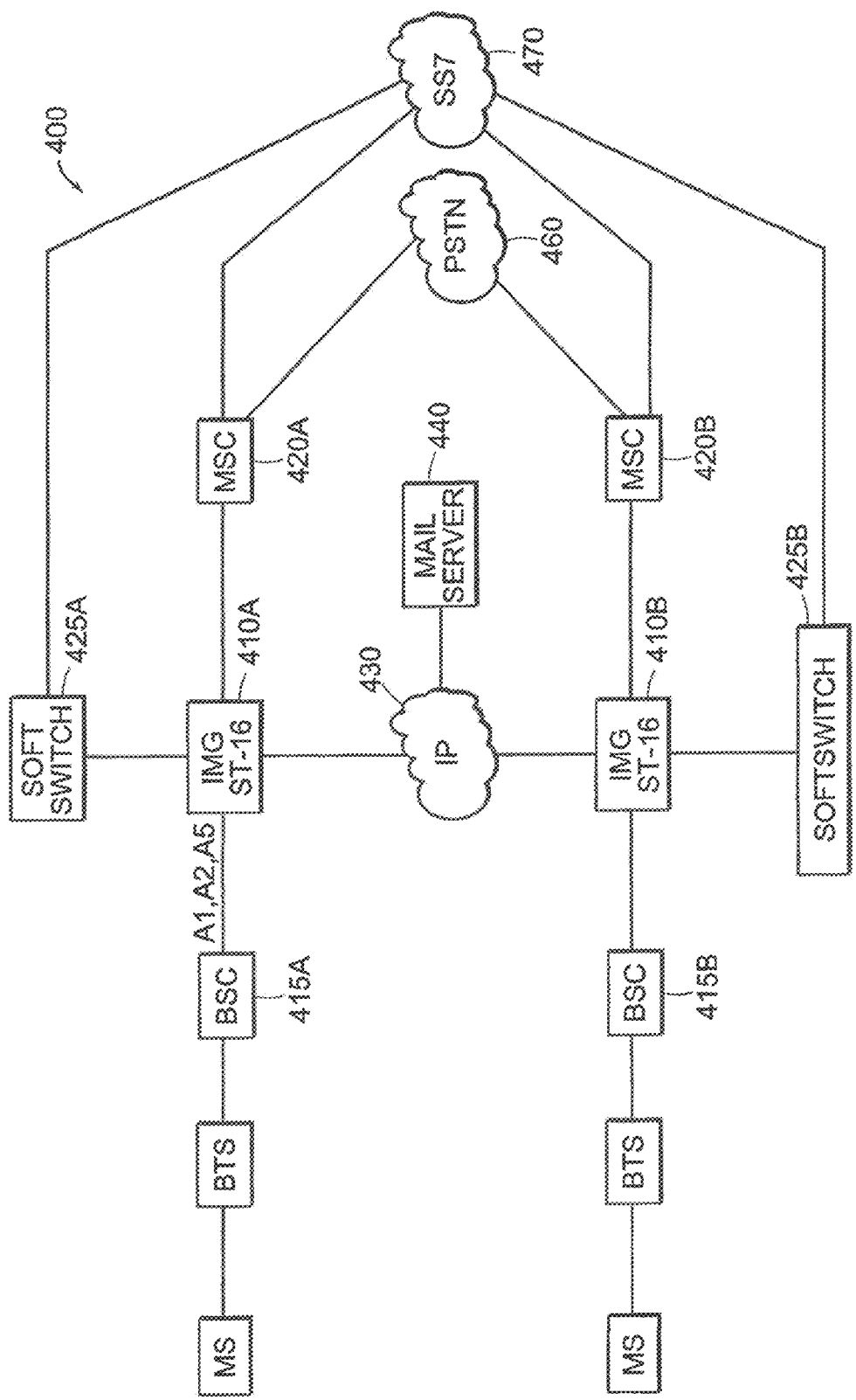
Figure 3B:
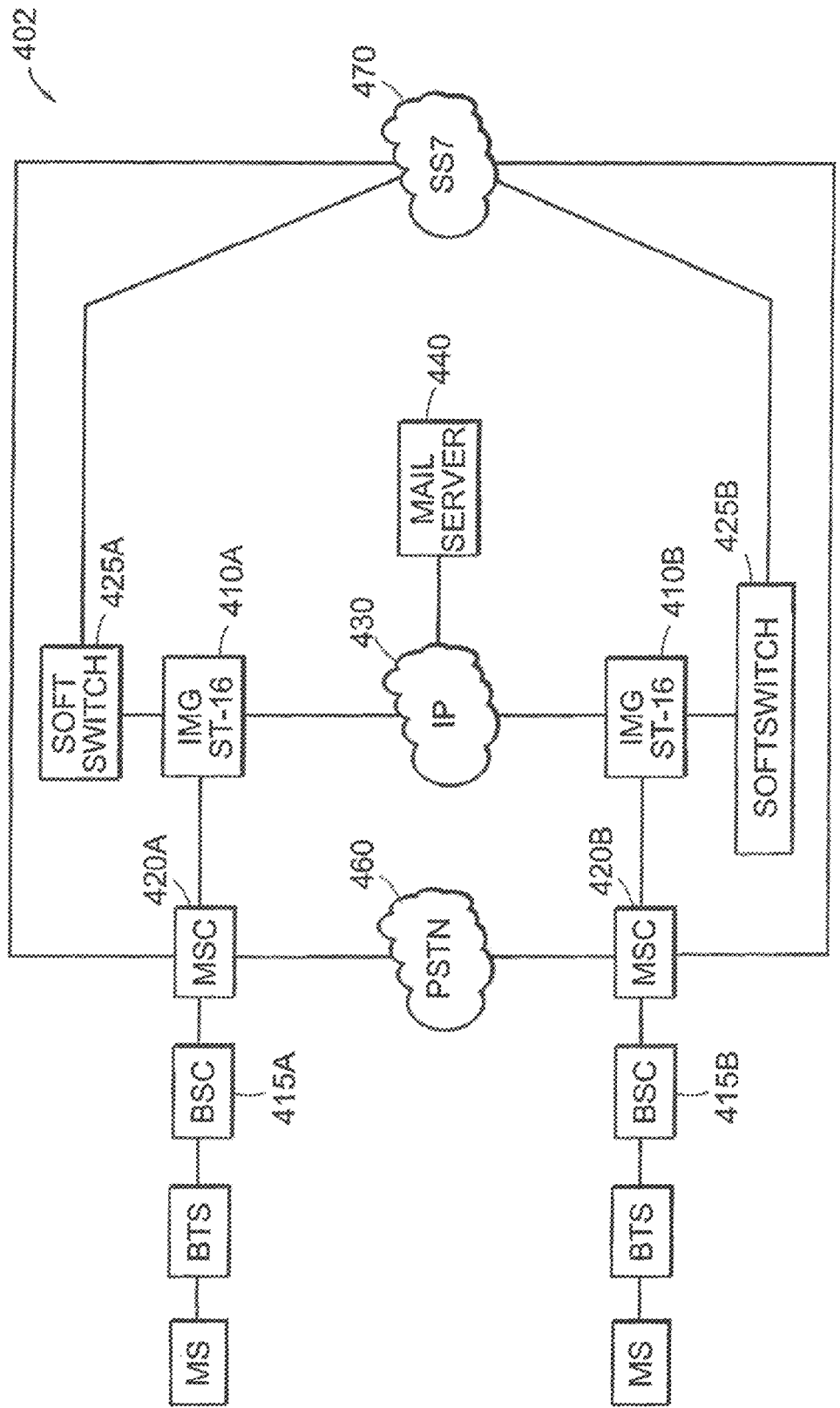

A communications system provides communications features including features relying on sharing or combining computing resources. The communications system has an Internet media gateway mechanism ("IMG") and a Softswitch mechanism as described below. FIG. 3A illustrates an example system 400 having an IMG 410A connected between BSC 415A and MSC 420A and communicating with a Softswitch 425A. IMG 410A communicates with BSC 415A by A1, A2, and A5 interfaces. As described below, Softswitch 425A coordinates pathway setup and communication between BSC 415A and MSC 420A through IMG 410A. IMG 410A also communicates with the Internet 430, through which IMG 410A is able to direct messages to a mail server 440, as described below. Other IMGs and Softswitches may be provided similarly in connection with other BSCs and MSCs as exemplified in FIG. 3A by IMG 410B, Softswitch 425B, BSC 415B, and MSC 420B. MSCs 420A, 420B are connected to, and can communicate with each other through, PSTN 460. SoftSwitches 425A, 425B are connected to, and can communicate with each other through, SS7 system 470. (FIG. 3B illustrates an alternative arrangement 402 in which MSC 420A is connected between IMG 410A and BSC 415A, and MSC 420B is connected between IMG 410B and BSC 415B.)

Figure 4:
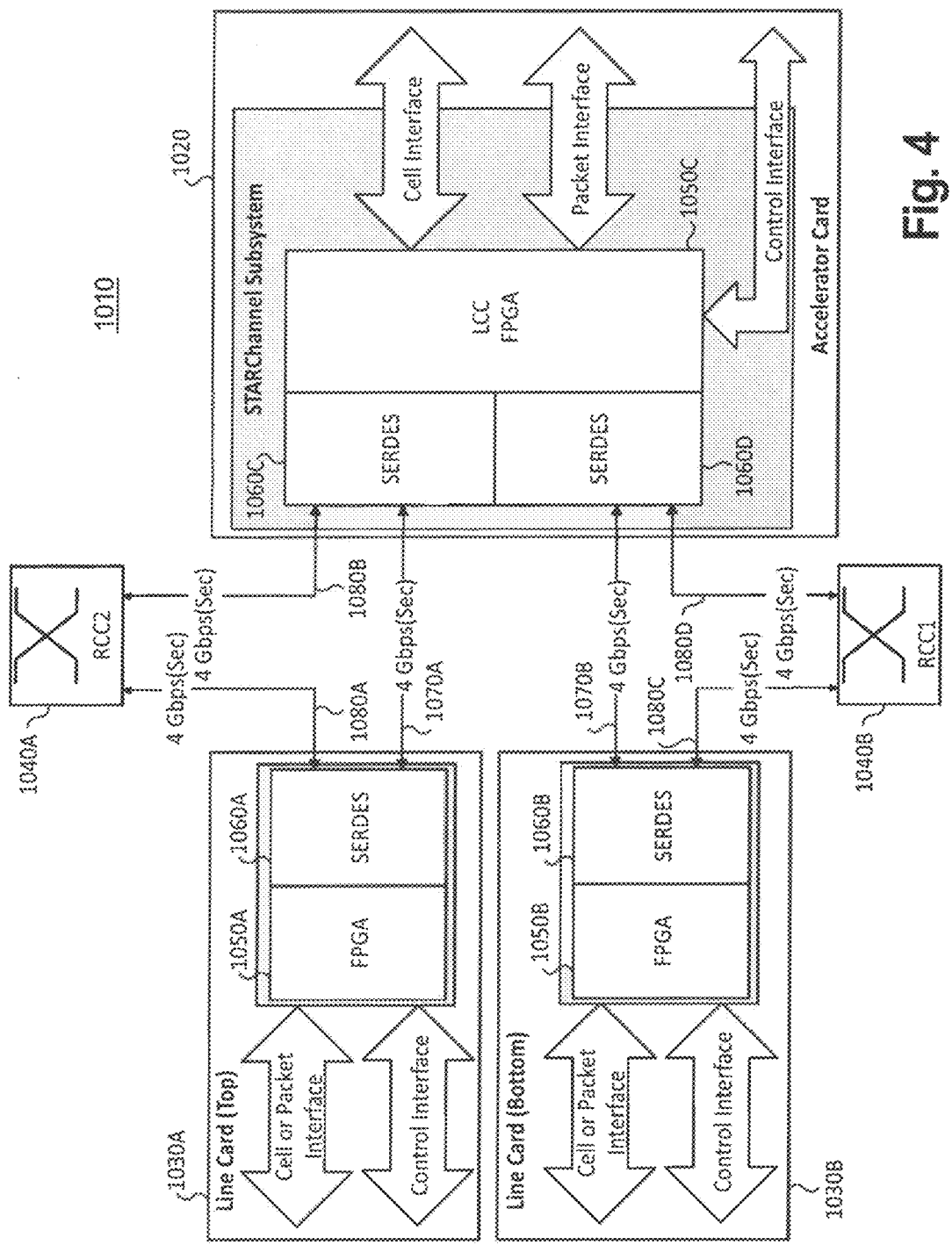

FIG. 4 illustrates a system 1010 that can support and help to provide voice and data services on one or more mobile wireless networks. In a particular implementation, system 1010 may include Starent Networks Corporation's ST-16 IMG product, which is a carrier class, high performance platform that can support multiple data types including time division multiplexed (TDM) data, Asynchronous Transfer mode (ATM) cell data, and Internet protocol (IP) packet data. The ST-16 architecture uses accelerator cards (e.g., card 1020) such as Packet Accelerator cards (PACs) for packet processing and Telephony Accelerator cards (TACs) for voice processing. Each PAC can perform data processing and each TAC can perform voice processing. In the ST-16, physical input/output (I/O) interfaces are terminated on industry standard line cards (e.g., cards 1030A, 1030B) and can carry TDM, packet or ATM cell data types in accordance with various physical interface standards. Since TDM interfaces primarily carry voice traffic, TDM line cards communicate with a TAC. Ethernet line cards carry packet data traffic and can communicate with a PAC. An optical line card supports ATM cells, which can carry both voice and data traffic, and can communicate with a PAC or a TAC. The ST-16 also has Redundant Crossbar Cards (RCCs) (e.g., cards 1040A, 1040B) which are used to allow a line card in any slot to communicate with an accelerator cards in any slot in the ST-16.

The ST-16 uses a card to card communication system ("STARChannel") to provide links to connect the accelerator cards to the line cards and the RCCs. In an example implementation, a STARChannel link has 4.0 Gbps data capacity and includes two physical serial links operating in channel locked mode. Each physical serial link is clocked at 2.5 Gbps (8B/10B coded) and can carry 2.0 Gbps data.

In the ST-16, it is desirable to implement virtualization and a distributed host.

With respect to virtualization, multiple hosts are implemented on the same processor or the same instance of the operating system, with possibly more than one IP address implemented on the same system and with different contexts as described below. With respect to IP networking, each context is well isolated from each other context. Accordingly, the same IP address may be used in two different contexts such that the IP address serves as two different entities. This is desirable at least in the case of private networks which are isolated from the Internet. Different private networks may use the same IP address, but because the private networks are separated from each other, the same IP address has a different meaning in each of the private networks.

It is sometimes desirable to have one piece of equipment participate in multiple private networks without leaking information between the private networks. For example, the equipment may provide a set of functionality to each private network in a set of private networks simultaneously without turning the private networks into one network. The contexts allow two pieces of software to run on the same physical piece of equipment, and possibly on the same instance of the operating system, as readily or nearly as readily as running one of the pieces of software on one physical system and running the other piece of software on another physical system.

For example, with the contexts, a single piece of equipment that serves two private networks can have the same IP address on both private networks and can react differently to an incoming message depending on which network issued the message.

Private networks may share an IP address by happenstance or by design, or as a result of address scarcity. In the latter case, on the Internet, it may be difficult or expensive to gain use of a substantial amount of routable address space (address space that is use to communicate directly on the Internet). As a result, a private network is sometimes used as an alternative to a large block of routable address space. The private network multiplies an IP address much as a private office telephone system with extensions multiplies a single main public telephone number, wherein computers on the private network can intercommunicate using Internet protocols without necessarily involving the Internet itself, much as users of the private office telephone system can intercommunicate without necessarily involving the public telephone system.

In the case of virtualization, a single piece of equipment may be reachable at the same address on two different private networks much as, for example, a voicemail system may be reachable at the same telephone extension (e.g., extension 110) from two separate private office telephone systems. An incoming communication at the single piece of equipment is handled differently depending on which private network sent the communication, much as an incoming call arriving at the voicemail system at the telephone extension is handled differently depending on which private office telephone system originated the call. In both cases it can be critical to avoid mishandling.

Conventionally, the Linux operating system cannot serve two private networks as the voicemail system serves the two private office telephone systems. By virtualization as described below, the Linux operating system can participate in two or more different private networks and avoid mishandling even when the same addresses are used on the private networks. For virtualization, in many or all of the places inside the operating system kernel that deal with IP networking, an element is added to many or all appropriate data structures to indicate, e.g., by context number, the appropriate context for handling data such as an incoming data packet.

In a specific implementation, the element holds the context number in every relevant data structure inside the kernel, including a routing table, and every packet that is processed by the system is tagged with a context number so that as the packet goes through the system, the system keeps track of the context with which the packet is associated. The Linux operating system allows multiple instances of the routing table; each context has its own routing table and each routing table is associated with a context number. Each interface to the system is associated with a context number so that when a packet comes into the system, the system is able to determine the context to which the packet belongs. Each data structure that is part of the kernel's interface to an application is associated with a context number. Thus, for example, an abstraction known as a socket that an application uses in order to use networking is associated with a context number so that the system can determine the context to which a socket being used by an application belongs.

As a result, in at least some implementations, the system can have a single instance of the operating system that operates in multiple contexts, based on contextualization/virtualization in the kernel, so that the system can run application code that was generically written for Linux or any Unix like operating system, with few or no modifications to the application code.

The distributed host differs from virtualization in that the distributed host allows the host implementation for one Internet Protocol (IP) address to be spread across multiple, loosely coupled processors running separate instances of the operating system, so that the processors implement a single IP host. Accordingly, combined processing power can be used for one IP host, which may allow results that are not practical or possible using only the processing power available on one processor.

Unlike a scheme under which the computer system is caused to behave as multiple hosts, the distributed host is compatible with an existing configuration or existing protocols that require actions to be done on one host. The distributed host can be used with an existing configuration such that, for example, a customer need not change the general design of the customer's implementation. In particular, in at least some implementations, the distributed host system can run application software that was written for Linux or another Unix style environment with few or no modifications to the application software. Accordingly, the distributed host system allows incorporation of value added or extended features into the system, including by porting existing software which is already able to run on Linux or another Unix type operating system.

With respect to a specific implementation, the modifications to the Linux IP implementation fall into two broad categories:

(1) For virtualization, support for virtual routers and virtual hosts to allow an individual operating system instance to support both router (forwarding) and host functions of IP as if it were multiple operating system instances, i.e., support for multiple distinct IP address spaces, even if the spaces overlap numerically, as distinct.

(2) For distributed hosts, support for distributed IP hosts, to allow offering services on different Transport Control Protocol (TCP) or User Datagram Protocol (UDP) ports of the same host from different operating system instances.

Figure 5:
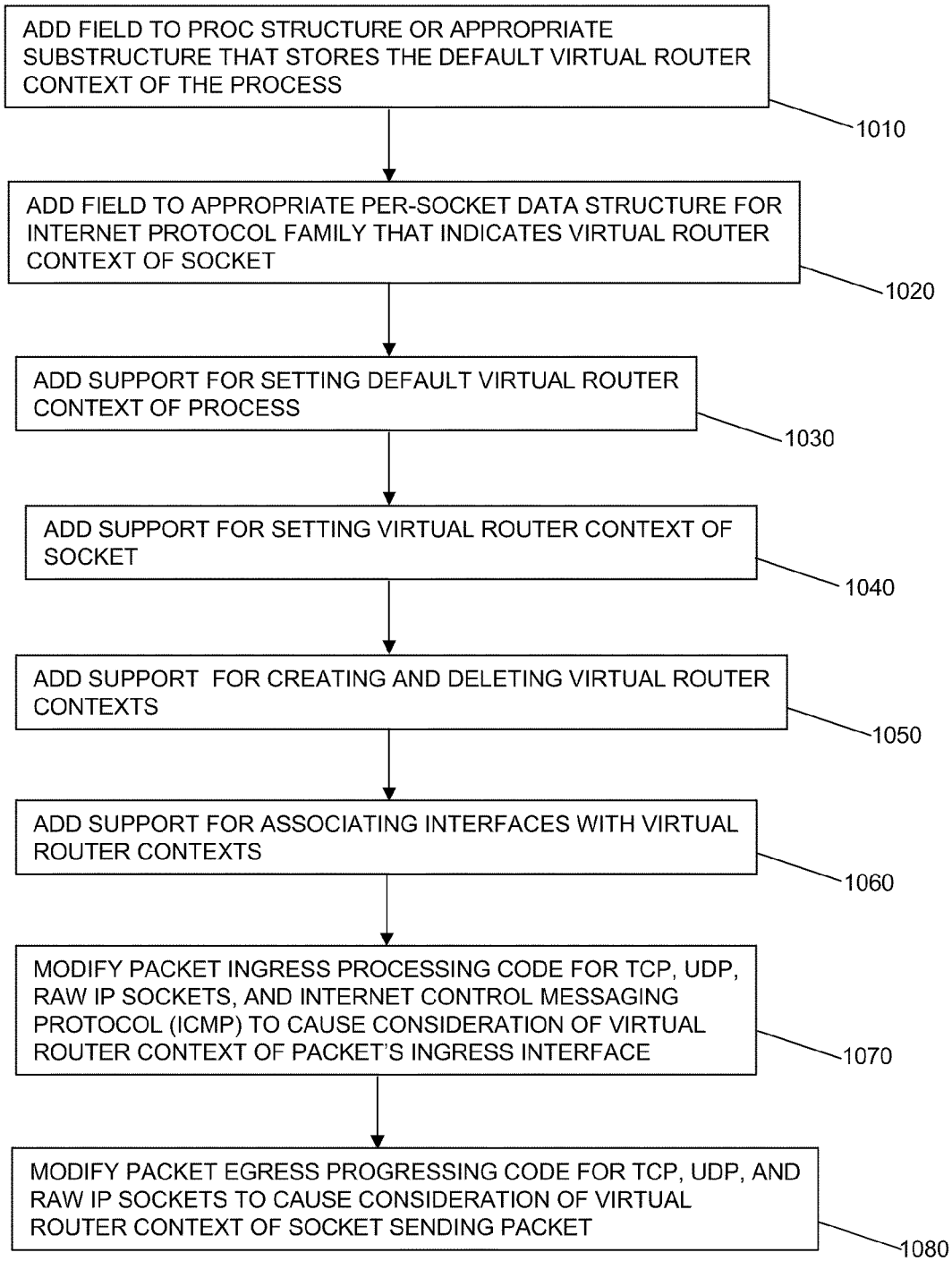
FIGS. 5-6 are flow diagrams of methods for use in managing resources for IP networking.

Conventional Linux includes support for multiple routing tables, which is all or nearly all that is necessary for virtualized forwarding support. However, conventional Linux does not support for virtualized host functions. Specifically, conventional Linux does not provide a way for a process or socket to select its virtual router context nor a way for two or more different processes to bind the same address/protocol/port (in different virtual router contexts). The following modifications (FIG. 5) add such support.

A field is added to the proc structure or an appropriate substructure (the proc structure is the kernel data structure which is instantiated per-process and contains kernel process state information) that stores the default virtual router context of the process (step 1010). Kernel process creation code is modified as appropriate to make the field heritable, such that the default virtual router context of a process will be, at its time of creation, whatever the default virtual router context of its parent was when its parent used fork( ) or clone( ). Also, the code that sets up the initial system process, init, is modified to make sure that init will use a default virtual router context which is automatically created at boot time.

A field is added to the appropriate per-socket data structure for Internet protocol family (TCP, UDP, and raw IP) that indicates the virtual router context of the socket (step 1020). Socket creation code is modified so that, on creation, the field is populated from the default virtual router context for the process.

Support is added for setting the default virtual router context of a process (e.g., as a procfs extension) (step 1030).

Support is added for setting the virtual router context of a socket (e.g., as a setsockopt) (step 1040).

Support is added for creating and deleting virtual router contexts (e.g., as a procfs or netlink extension) (step 1050).

Support is added for associating interfaces with virtual router contexts (e.g., as a procfs or netlink extension) (step 1060).

Packet ingress processing code for TCP, UDP, raw IP sockets, and Internet Control Messaging Protocol (ICMP) is modified to cause its determination of the socket with which an ingress packet is associated consider the virtual router context of the packet's ingress interface (step 1070).

Packet egress processing code for TCP, UDP, and raw IP sockets is modified to cause the selection of the routing table to use for egress packets consider the virtual router context of the socket sending the packet (step 1080).

In the case of distributed host, the distributed host functionality allows processes running on different operating system instances to bind different sockets on the same host (IP address). In at least one specific implementation, the following approach may be taken.

For ingress packets where the network processor (NP) subsystem can determine that a certain processor will be the consumer of that packet, the packet is sent to that processor.

For ingress packets where the NP subsystem cannot determine that a certain processor will be the consumer of that packet, the packet is sent to all processors (e.g., via Media Access Control (MAC) broadcast).

When a processor receives a packet that the processor determines is not for it (but that could be for a different processor), the processor ignores that packet and makes no effort to respond to that packet in any way.

For each (distributed) host, one particular processor is designated as the lead processor for that host. That processor has the duty of processing and responding to packets that correspond to the host as a whole and not to any specific "connection" or "port", e.g., some (but not all) ICMP packets and Address Resolution Protocol (ARP) requests. All other processors ignore such ingress packets.

Processing for egress packets from a distributed host is essentially unchanged from processing for egress packets for a normal host.

For testing and simulation (without the NP subsystem) functionality is added to allow the lead processor for a host to forward (by MAC broadcast) packets not destined for itself to other processors. In IP technology, the functionality is less like classic forwarding (since, e.g., TTL is not decremented) and more like bridging.

Figure 6:
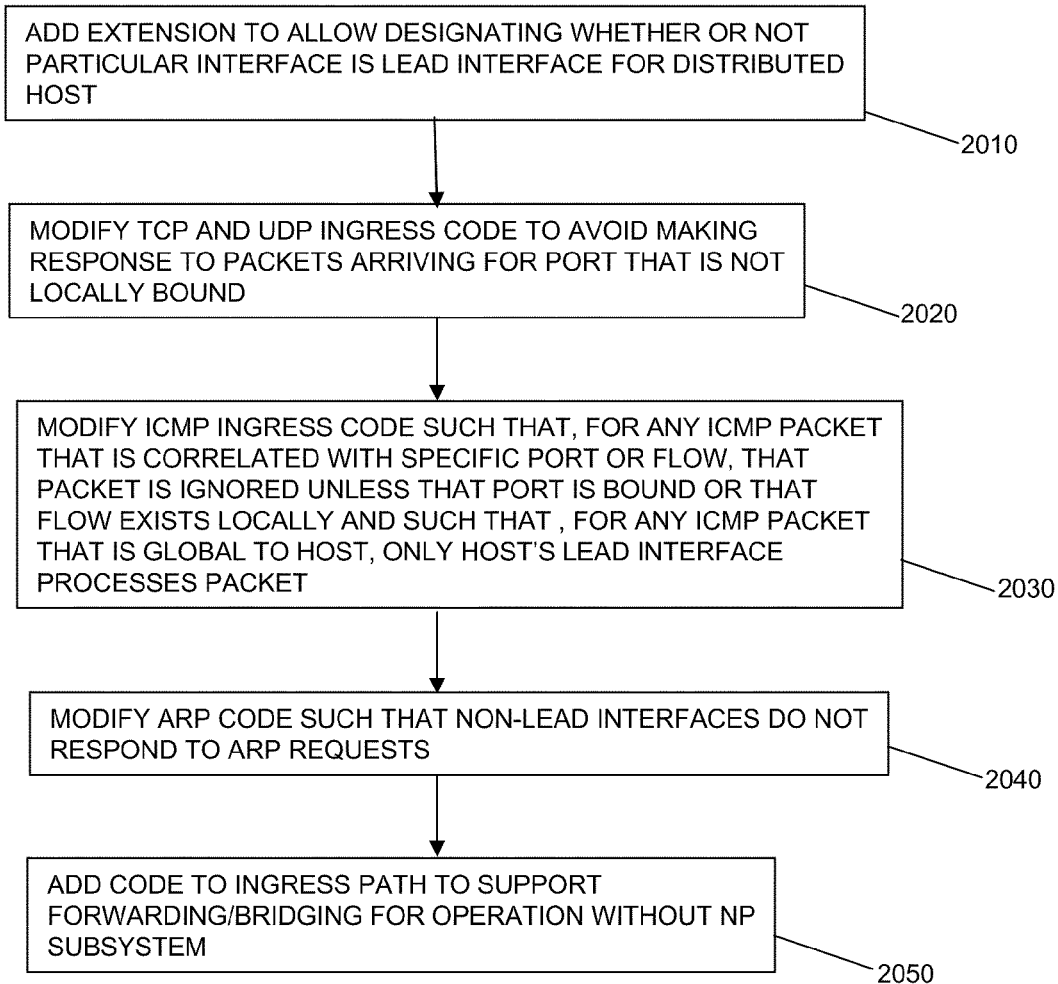

The following kernel changes (FIG. 6) are used to implement the distributed host function as described above.

An extension (e.g., a procfs or netlink extension) is added to allow designating whether or not a particular interface is the lead interface for a distributed host (step 2010).

TCP and UDP ingress code is modified to avoid making any response to packets arriving for a port that is not locally bound (step 2020).

ICMP ingress code is modified such that, for any ICMP packet that is correlated with a specific port or flow, that packet is ignored unless that port is bound or that flow exists locally and such that, for any ICMP packet that is global to the host (e.g., echo request), only the host's lead interface processes the packet (step 2030).

ARP code is modified such that non-lead interfaces do not respond to ARP requests (step 2040).

Code is added to the ingress path to support the forwarding/bridging described above for operation without an NP subsystem (step 2050).

More particularly with respect to kernel IP virtualization, all IP packet buffers (skbuffs) within the kernel are tagged with a context number. The context number of a packet being processed is determined by one of two mechanisms:

(1) A packet that enters the kernel via a network interface is tagged with the context number that has been configured into the interface. The following code in ip_rcv( ) (net/ipv4/ip_input.c) tags the buffer for any IP packet being introduced by a network interface:

```
if (dev != &loopback_dev) {
    if (in_dev) {
        skb->vr_index=in_dev->vr_index;
    } else {
        skb->vr_index=0; /*XXX not very good but there's probably no
            *better
        option. I'm not sure if it
            *should ever
        happen anyways that a
            *packet would
        get here from a device
            *without an
        in_device structure*/
    }
}
```

(2) A packet that enters the kernel via an application socket is tagged with the context number that has been configured into the socket (by default, this is the default context number of the application that created the socket) as it is being prepared for output. Relevant software code is mainly in net/ipv4/ip_output.c. The following is an example from ip_build_xmit( ):

skb->vr_index=sk->vr_index;

In the listings above, skb is a pointer to an skbuff structure; sk is a pointer to a socket structure. In addition, vr_index fields to both structures to accommodate virtualization.

When the kernel needs to deliver a packet to a user process, it takes the packet's context number into account when making the determination of the process to which to deliver the packet. The following is an example from software code that makes the determination for a TCP packet:

```
sk = __tcp_v4_lookup(
#ifdef CONFIG_NET_IP_VIRTUAL
    skb->vr_index,
#endif
    skb->nh.iph->saddr, th->source,
    skb->nh.iph->daddr, ntohs(th->dest), tcp_v4_iif(skb));
```

The listing above is from tcp_v4 rcv( ) in net/ipv4/tcp_ipv4.c. CONFIG_NET_IP_VIRTUAL is defined when the kernel is being built with IP virtualization support. As shown, an additional argument is prepended to the argument list of _tcp_v4_lookup when virtualization is in use. Further, _tcp_v4_lookup( ) allows a determination of the socket that will consume a packet, and performs a lookup in a hash table. When virtualization is in use, the context number of the packet (skb->vr_index) is used as an element of the key when performing the lookup. In this way, for example, two different packets which otherwise have identical characteristics (source address, source port, destination address, destination port) but belong to different contexts can be directed to two different sockets.

When the kernel is performing an IP forwarding lookup (e.g., when acting as a router or when delivering a packet that originated with a local application to a remote destination), that lookup is also made taking the packet's context into consideration. In particular, a different routing table is used for each packet. For virtualization, the following code is added to fib_lookup( ) (in net/ipv4/fib_rules.c), which performs many or most route lookups:

```
#ifdef CONFIG_NET_IP_VIRTUAL
    if (r==(&main_rule)) {
        if ((vr<r->r_vr_index_min)||
            (vr>r->r_vr_index_max)) {
                printk("fib_lookup - bad VR index!\n");
                continue;
        }
        if ((tb = fib_get_table((r->r_table)+vr)) == NULL)
            continue;
    } else {
#endif /*CONFIG_NET_IP_VIRTUAL*/
```

In the listing above, vr is an additional argument to fib_lookup that is prepended to the argument list when CONFIG_NET_IP_VIRTUAL is defined. The call to fib_get_table( ) takes a routing table number; support for virtualization makes use of Linux's existing ability to support multiple routing tables. When contextualization is in use, the context number is used to compute the routing table number. The remainder of fib_lookup( ) operates on the routing table returned by the call to fib_get_table( ).

Further with respect to implementing distributed host functionality on Linux, "cluster" below refers collectively to a group of systems implementing a single distributed host. At least one specific implementation depends on the following.

Each kernel participating in a distributed host is able to determine whether or not it is the "leader" of that distributed host, and, if not, which system is the "leader" for that distributed host. The "leader" of a distributed host is a system designated (e.g., uniquely) to perform certain services for the whole distributed host. In general, this is used for those services that cannot themselves be reasonably distributed. This information is maintained on a per-interface-address basis, e.g., within the in_ifaddr structures.

For those protocols to be distributed on a per-port or per-connection basis (e.g., UDP and TCP), the actual protocols are modified such that, when a packet arrives at the set of systems implementing the distributed host, it can be determined exactly which system will process that particular packet. In general, accordingly, a database is maintained with entries indicating which ports and/or connections are being handled on which system. This may be accomplished by implementing an interface between the kernel and a user process that has some similarities to a "rtnetlink" interface used by user processes that implement routing protocols. In particular, such an interface notifies the user process of requests by other user processes to bind( ) ports and accept( ) connections. The user process using this interface is responsible for synchronizing the database with remote hosts in the cluster, or at least with the leader of the distributed interface. In at least most cases, functions such as tcp_v4_rcv( ) and udp_rcv( ) are modified to look up, for each incoming packet, whether that packet should be processed or ignored and/or sent to another member of the cluster.

In at least some implementations, for some protocols (e.g., ARP), it is sufficient simply to handle all requests on the leader system and always ignore requests reaching non-leader systems. For ARP, this may be accomplished by modifying arp_rcv( ) to check whether or not the packet being received corresponds to an address for which the local system is the leader. For the leader case, the packet may be processed normally. For the non-leader case, the packet may be ignored or sent to another member of the cluster.

For some protocols (e.g., ICMP and perhaps IGMP, if IP multicasting is supported in a distributed way), received packets are handled differently in the distributed host environment. For ICMP, each packet other than an echo request may be sent to all systems in the cluster implementing the distributed host and then each system may determine the action, if any, to take based on that packet. Echo requests are processed by the leader system. Other ICMP packets are generally handled by each system in the same way as if the system were not part of a distributed host. The precise handling of ICMP packets in a distributed host environment depends on the specific implementation.

The origination of ICMP error packets by systems within a distributed host cluster is modified with respect to how they are generated when no distributed host facility is in use. Specifically, "ICMP unreachable" messages may be generated only by the leader system. At least some other ICMP messages may be generated by non-leader systems in the cluster, depending on the specific implementation.

Other embodiments are within the scope of the following claims. For example, one or more of the features above may be implemented in object code or executable code. One or more of the features above may be implemented for use with only certain communications, such as incoming communications only, or outgoing communications only, or real-time communications only, or high priority or high datarate communications only. An operating system may be provided with one or more of the features as built-in functionality.

What is claimed is:

1. A method for using a network device having an operating system instance that operates in a plurality of routing contexts, the method comprising:
associating a first network with a first routing context and a second network with a second routing context, wherein the first context is isolated from the second context;
enabling a first application running on the operating system instance of the network device to select the first routing context by associating the first application with a first routing context number;
enabling a second application running on the operating system instance of the network device to select the second routing context by associating the second application with a second routing context number;
receiving, at the same networking address of the network device, a first message originating from the first network and a second message originating from the second network by the network device;
at a packet ingress processing module in the network device, assigning to the first message either the first routing context number or the second routing context number based on one of a source network interface and a source application socket; and
providing heritability of the first routing context number, wherein the heritability assigns to a child application of the first application a default routing context associated with the first routing context.

2. The method of claim 1, wherein a socket for at least one of Transport Control Protocol (TCP), User Datagram Protocol (UDP), and raw IP code associated with the operating system instance inherits the first routing context from a process in the first routing context.

3. The method of claim 1, further comprising:
assigning to the first message the first routing context number, wherein the first message is determined to be associated with the first routing context using the first routing context number; and
assigning to the second message the second routing context number, wherein the second message is determined to be associated with the second routing context using the second routing context number.

4. The method of claim 3, further comprising:
assigning a first routing table to the first router context, wherein the first routing table is associated with the first context number; and
assigning a second routing table to the second router context, wherein the second routing table is associated with the second context number.

5. The method of claim 1, wherein the first and second networks are private networks that are isolated from the Internet.

6. The method of claim 1, wherein information received by the network device from the first network is not provided to the second network by the network device, and wherein information received by the network device from the second network is not provided to the first network by the network device.

7. The method of claim 1, wherein both the first message and the second message include at least one data packet.

8. The method of claim 1, wherein the first and second messages are received by the network device using a first network connection initiated by a first process and a second network connection initiated by a second process, respectively, the method further comprising:
assigning to the first process a default first routing context number associated with the first network connection; and
assigning to the second process a default second routing context number associated with the second network connection.

9. The method of claim 8, wherein the heritability further comprises inheriting the default first routing context by a third process, whose parent is the first process, at the time of creation of the third process.

10. The method of claim 1, further comprising associating at least one interface to the operating system instance with a routing context.

11. The method of claim 1, further comprising providing an IP host that is compatible with existing protocols.

12. The method of claim 1, further comprising running separate operating system instances on a plurality of processors residing on the network device, which implement a single IP host.

13. A system for use with a first network that is associated with a first routing context, and a second network that is associated with a second routing context, the system comprising:

a network device that receives messages from both the first network and second network at a networking address, wherein the network device is configured to enable a first application to select the first routing context by associating the first application with a first routing request number, and to enable a second application to select the second routing context by associating the second application with a second routing context number, and the network device tags the messages to maintain the association with a routing context while being processed by the network device, the network device implementing a process that assigns either the first routing context number or the second routing context number to at least one of the messages received by the network device at a packet ingress processing module in the network device, wherein the process inherits a default routing context associated with the first routing context when the process is created by the first routing context; and a plurality of processors residing in the network device implementing a distributed host, wherein a processor of the plurality of processors implements multiple hosts.

* * * * *